United States Patent
Ramey et al.

(10) Patent No.: US 10,942,876 B1
(45) Date of Patent: Mar. 9, 2021

(54) HARDWARE ENGINE FOR CONFIGURATION REGISTER SETUP

(71) Applicant: MELLANOX TECHNOLOGIES, LTD., Yokneam (IL)

(72) Inventors: Carl Ramey, Westborough, MA (US); Christopher Jackson, Boston, MA (US); Diane Orf, Middlesex, MA (US); Matt Orsini, Rehoboth, MA (US); Michael Cotsford, Bellingham, MA (US); Mark B. Rosenbluth, Uxbridge, MA (US); Rui Xu, Marlborough, MA (US)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 0 days.

(21) Appl. No.: 16/683,300

(22) Filed: Nov. 14, 2019

(51) Int. Cl.
*G06F 13/20* (2006.01)
*G06F 9/30* (2018.01)
*G06F 13/42* (2006.01)

(52) U.S. Cl.
CPC .......... *G06F 13/20* (2013.01); *G06F 9/30101* (2013.01); *G06F 13/4221* (2013.01); *G06F 2213/0024* (2013.01)

(58) Field of Classification Search
CPC .................. G06F 13/20; G06F 13/4221; G06F 2213/0024
See application file for complete search history.

(56) References Cited

U.S. PATENT DOCUMENTS

| 6,564,294 B1 * | 5/2003 | Fujibayashi .......... G06F 3/0613 709/213 |
| 7,636,835 B1 | 12/2009 | Ramey et al. |
| 7,805,575 B1 | 9/2010 | Agarwal et al. |
| 7,882,307 B1 | 2/2011 | Wentzlaff et al. |
| 8,738,860 B1 | 5/2014 | Griffin et al. |
| 8,799,914 B1 | 8/2014 | Metcalf |

(Continued)

OTHER PUBLICATIONS

U.S. Appl. No. 16/519,112 office action dated May 29, 2020.
PCI Express® Base Specification Revision 3.0, pp. 1-860, Nov. 10, 2010.

*Primary Examiner* — Tim T Vo
*Assistant Examiner* — Harry Z Wang
(74) *Attorney, Agent, or Firm* — Kligler & Associates Patent Attorneys Ltd (57) ABSTRACT

One embodiment includes a computing device including peripheral component bus interfaces for connection to a peripheral component bus, a first integrated circuit (IC) chip comprising a processor to initiate a register setup process of the device, a second IC chip including a tile processor including multiple tiles, each tile including at least a processing core configured to generate requests to at least one of the peripheral component bus interfaces, steering configuration registers to store steering configuration data, and steering logic to steer the generated requests responsively to the steering configuration data in the steering configuration registers, and steering register setup circuitry including a multicaster and a register setup memory, wherein the processor is configured to write the steering configuration data to the register setup memory, and the multicaster is configured to multicast the steering configuration data written to the register setup memory to the steering configuration registers of the tiles.

9 Claims, 7 Drawing Sheets

(56) References Cited

U.S. PATENT DOCUMENTS

| | | | |
|---|---|---|---|
| 2004/0139305 A1* | 7/2004 | Arimilli | G06F 11/3636 |
| | | | 712/227 |
| 2012/0297043 A1 | 11/2012 | Davis et al. | |
| 2018/0232044 A1* | 8/2018 | Chall | H01L 23/041 |
| 2018/0260160 A1* | 9/2018 | Sherlock | G06F 3/0685 |
| 2019/0286223 A1* | 9/2019 | Furman | G06F 15/7807 |
| 2019/0303328 A1* | 10/2019 | Balski | G06F 15/7825 |

\* cited by examiner

HARDWARE ENGINE FOR CONFIGURATION REGISTER SETUP

FIELD OF THE INVENTION

The present invention relates to computing devices, and in particular, but not exclusively to, register setup.

BACKGROUND

FPGAs (Field Programmable Gate Arrays) and ASICs (Application Specific Integrated Circuits) are two exemplary approaches for implementing customized logic circuits. Costs associated with ASICs include verification, physical design, timing closure, and non-recurring costs. Unlike an ASIC, an FPGA is reprogrammable in that it can be reconfigured for each application and changed even after the design has been shipped to customers, much like software can be updated. However, FPGAs are typically more expensive than an ASIC. FPGAs typically consume more power and lower performance compared to an ASIC.

Multicore systems (e.g., tile processors) use parallel processing to achieve some features of both ASICs and FPGAs. For example, some multicore systems are power efficient like an ASIC because they use custom logic for some functions, and reconfigurable like FPGAs because they are programmable in software.

PCI Express® or PCIe is a known high-speed serial computer expansion bus standard. Modern multicore core systems on a chip (SOC) that implement high rate PCIe root complex, often have multiple downstream ports and internally embed PCIe switch functionality. PCI Express lanes of a wide port (e.g. 16 full duplex lanes) can be bifurcated into multiple narrower ports (e.g., 8, downstream ports of two full duplex lanes) that can be dedicated channels for various devices in a system. PCIe base address range definitions (BAR's) are programmed and used for PCIe controller address mapping.

Coherent mesh interconnections are used for many-core scalable platforms. Routing packets in such mesh interconnection use routers of neighboring tiles and a routing function to send data from a source tile coordinate to a destination tile coordinate, or to an edge of a mesh array. Transactions running to IO peripherals traverse the mesh interconnect towards a protocol translation block that is located outside of the mesh array. In the protocol translation block, coherent bus transactions are converted by a PCIe controller to PCI transaction layer packets (TLPs).

SUMMARY

There is provided in accordance with an embodiment of the present disclosure, a computing device, including peripheral component bus interfaces configured for connection to a peripheral component bus, a first integrated circuit (IC) chip including a processor configured to initiate a register setup process of the device, a second IC chip including a tile processor including multiple tiles, each tile including at least a processing core configured to generate requests to at least one of the peripheral component bus interfaces, steering configuration registers, which are configured to store steering configuration data, and steering logic configured to steer the generated requests responsively to the steering configuration data in the steering configuration registers, and steering register setup circuitry including a multicaster and a register setup memory, and a chip interface configured to provide data connection between the first IC chip and the second IC chip, wherein the processor is configured to write, as part of the register setup process, the steering configuration data to the register setup memory on the second IC chip via the chip interface, and the multicaster is configured, responsively to the steering configuration data being written to the register setup memory, to multicast the steering configuration data written to the register setup memory on the second IC chip to the steering configuration registers of the tiles on the second IC chip.

Further in accordance with an embodiment of the present disclosure the processor is configured to execute software code, which includes instructions, when read by the processor cause the processor to write, as part of the register setup process, the steering configuration data to the register setup memory on the second chip via the chip interface, and the multicaster includes a hardware state machine configured to multicast the steering configuration data written to the register setup memory on the second chip to the steering configuration registers of the tiles on the second chip.

Still further in accordance with an embodiment of the present disclosure the register setup memory includes respective setup registers associated with respective offsets in the steering configuration registers of the tiles, the steering configuration data includes respective portions, the processor is configured to write, as part of the register setup process, the respective portions of the steering configuration data to the respective setup registers in the register setup memory, and the multicaster is configured, responsively to the steering configuration data being written to the register setup memory, to multicast the respective portions of the steering configuration data written to the respective setup registers to the respective offsets in the steering configuration registers of the tiles.

Additionally, in accordance with an embodiment of the present disclosure the multicaster is configured to provide an acknowledgement that the steering configuration data has been written to the steering configuration registers of the tiles.

Moreover, in accordance with an embodiment of the present disclosure the steering register setup circuitry includes an idle flag register, the multicaster is configured to set the idle flag register to provide the acknowledgement that the steering configuration data has been written to the steering configuration registers of the tiles, and the processor is configured to read the idle flag register to confirm that the steering configuration data has been written to the steering configuration registers of the tiles.

Further in accordance with an embodiment of the present disclosure the steering register setup circuitry includes respective multicast flag registers for the respective setup registers, the multicaster is configured to set respective ones of the multicast flag registers responsively to the processor writing respective ones of the portions to the respective setup registers, and the multicaster is configured to reset respective ones of the multicast flag registers responsively to multicasting respective ones of the portions to the respective offsets in the steering configuration registers of the tiles.

Still further in accordance with an embodiment of the present disclosure the steering register setup circuitry includes a counter set to an initial value, the multicaster is configured to advance the counter in a first direction responsively to the multicaster transmitting one of the portions of the steering configuration data to one of the steering configuration registers of one of the tiles, the multicaster is configured to receive a message from one of the tiles confirming that one of the portions of the steering configuration data has been written to one of the steering configuration registers, and the multicaster is configured, responsively to receiving the message, to advance the counter in a second direction, opposite to the first direction.

Additionally, in accordance with an embodiment of the present disclosure the multicaster is configured to provide the acknowledgement that the steering configuration data has been written to the steering configuration registers of the tiles responsively to the counter having a value equal to the initial value and each of the multicast flag registers being in a reset state.

Moreover in accordance with an embodiment of the present disclosure the processor is configured to write a first respective portion of the steering configuration data to a first respective one of the setup registers in the register setup memory, the multicaster is configured, responsively to the first respective portion being written to the register setup memory, to multicast the first respective portion to a respective one of the offsets in the steering configuration registers of the tiles, the multicaster is configured to provide an acknowledgement that the first respective portion has been written to the respective offset in the steering configuration registers of the tiles, and the processor is configured, responsively to the acknowledgement, to write a second respective portion of the steering configuration data to a second respective one of the setup registers in the register setup memory.

Further in accordance with an embodiment of the present disclosure the register setup memory includes a setup register and an address register, the steering configuration data includes respective portions, the processor is configured to write, as part of the register setup process a first portion of the steering configuration data to the setup register, and a first address, which is associated with the first portion, to the address register, and the multicaster is configured to multicast the first portion of the steering configuration data written to the setup register to an offset in the steering configuration registers of the tiles, the offset being given by the first address.

There is also provided in accordance with another embodiment of the present disclosure, a register setup method, including initiating a register setup process of a device, writing, as part of the boot process, steering configuration data from a first integrated circuit (IC) chip to a register setup memory on a second IC chip via a chip interface, responsively to the steering configuration data being written to the register setup memory, multicasting the steering configuration data written to the register setup memory on the second chip to the steering configuration registers of tiles on the second chip, each of the tiles generating requests to at least one peripheral component bus interface, and steering the generated requests responsively to the steering configuration data in the steering configuration registers.

Still further in accordance with an embodiment of the present disclosure the writing includes writing respective portions of the steering configuration data to the respective setup registers in the register setup memory, and the multicasting includes multicasting the respective portions of the steering configuration data written to the respective setup registers to respective offsets in the steering configuration registers of the tiles.

Additionally, in accordance with an embodiment of the present disclosure, the method includes providing an acknowledgement that the steering configuration data has been written to the steering configuration registers of the tiles.

Moreover in accordance with an embodiment of the present disclosure, the method includes setting an idle flag register to provide the acknowledgement that the steering configuration data has been written to the steering configuration registers of the tiles, and reading the idle flag register to confirm that the steering configuration data has been written to the steering configuration registers of the tiles.

Further in accordance with an embodiment of the present disclosure, the method includes setting respective multicast flag registers responsively to writing respective ones of the portions to the respective setup registers, and resetting respective ones of the multicast flag registers responsively to multicasting respective ones of the portions to the respective offsets in the steering configuration registers of the tiles.

Still further in accordance with an embodiment of the present disclosure, the method includes advancing a counter in a first direction responsively to transmitting one of the portions of the steering configuration data to one of the steering configuration registers of one of the tiles, receiving a message from one of the tiles confirming that one of the portions of the steering configuration data has been written to one of the steering configuration registers, and responsively to receiving the message, advancing the counter in a second direction, opposite to the first direction.

Additionally, in accordance with an embodiment of the present disclosure the providing includes providing the acknowledgement that the steering configuration data has been written to the steering configuration registers of the tiles responsively to the counter having a value equal to an initial value of the counter and the multicast flag registers being in a reset state.

Moreover in accordance with an embodiment of the present disclosure, the method includes writing a first respective portion of the steering configuration data to a first respective one of the setup registers in the register setup memory, responsively to the first respective portion being written to the register setup memory, multicasting the first respective portion to a respective one of the offsets in the steering configuration registers of the tiles, providing an acknowledgement that the first respective portion has been written to the respective offset in the steering configuration registers of the tiles, and responsively to the acknowledgement, writing a second respective portion of the steering configuration data to a second respective one of the setup registers in the register setup memory.

Further in accordance with an embodiment of the present disclosure the writing includes writing a first portion of the steering configuration data to a setup register in the register setup memory, and a first address, which is associated with the first portion, to an address register in the register setup memory, and multicasting the first portion of the steering configuration data written to the setup register to an offset in the steering configuration registers of the tiles, the offset being given by the first address.

BRIEF DESCRIPTION OF THE DRAWINGS

The present invention will be understood from the following detailed description, taken in conjunction with the drawings in which:

FIGS. 3 A-C are flowcharts including steps in a method of operation of a multicaster of the computing device of FIG. 1;

DESCRIPTION OF EXAMPLE EMBODIMENTS

Overview

In a computer device, a tile processor comprising multiple tiles may perform parallel computation tasks. Each tile may include one or more processing cores and steering logic to steer data between the tiles as well as to and from one or more peripheral elements, for example, a network controller and/or peripheral component bus interfaces, such as PCIe interfaces. Among other processing functions, the processing cores generate requests to the peripheral component bus interfaces. Each tile may include steering configuration registers (e.g., PCIe downstream bridge address range registers) which are configured identically so that each tile includes the same steering data for steering the requests generated by the processing cores to one or more of the peripheral component bus interfaces. By way of example, the registers configured in each tile may correspond to PCIe bridge ranges of the PCIe interfaces.

In order for the steering logic to steer the requests through the tiles to the relevant peripheral component bus interfaces, the steering logic of a tile determines which peripheral component bus interface a request should be routed to based on the contents of the steering configuration registers in the tile in which the steering logic resides. Using the address range in the request, the steering logic retrieves data from the steering configuration registers to determine how to steer the request.

On system boot, firmware or other software writes identical values to the steering configuration registers of multiple tiles. Multiple levels of indirection mechanisms are used to write each tile's steering configuration register values, making the procedure very time-consuming. For example, the firmware may be running on an integrated circuit (IC) chip, while the tile processor is running on another IC chip. With more and more tiles in a system, the steering configuration register setup procedure (e.g., PCIe bridge configuration procedure) may approach the firmware's timeout value. Additionally, the firmware needs to be tailored to write to all the different tiles and therefore requires knowledge of the number of tiles and tile addresses.

Therefore, embodiments of the present invention, solve the above problem by providing steering register setup circuitry, typically disposed on the same IC chip as a tile processor, including a register setup memory and a multicaster. On system boot, or any suitable time thereafter, the firmware (or other software), typically running on a processor disposed on a different IC chip to the IC chip of the tile processor, writes steering configuration data to the register setup memory. The multicaster detects that the steering configuration data has been written to the register setup memory and responsively multicasts the steering configuration data to the steering configuration registers in the multiple tiles.

In these embodiments, the firmware writes the steering configuration data once to the register setup memory disposed on the IC chip of the tile processor, whereas the multicaster multicasts the data to the multiple tiles which are typically on the same IC chip as the multicaster. Therefore, use of the slow path between the IC chip of the processor running the firmware and the IC chip of the tile processor is minimized.

Another advantage is faster system configuration time, as hardware multicasting is faster than multiple firmware write-operations.

Additionally, the firmware does not need to know the number of tiles or the tile addresses, or which tiles have been disabled, as the multicaster performs the multicasting to the tiles from the register setup memory. Therefore, the same firmware may be used for different products including different tile processors with different number of tiles, tile addresses, and/or different configurations of enabled/disabled tiles.

In some embodiments, the register setup memory includes respective setup registers associated with respective offsets in the steering configuration registers of the tiles. The firmware writes, as part of the register setup process, respective portions of the steering configuration data to the respective setup registers in the register setup memory. For example, a first portion of the steering configuration data is written to a first setup register, and a second portion of the steering configuration data is written to a second setup register, and so on. The multicaster, responsively to the steering configuration data being written to the register setup memory, multicasts the respective portions of the steering configuration data written to the respective setup registers to the respective offsets in the steering configuration registers of the tiles. For example, the first portion of the steering configuration data is multicast to the first offset in the steering configuration registers of each tile, while the second portion of the steering configuration data is multicast to the second offset in the steering configuration registers of each tile, and so on.

The firmware may write to all the setup registers, one after the other, without waiting for multicast completion in between writing to each setup register. The multicaster may maintain the status of an idle flag register (e.g., idle bit) which may be polled by the firmware to determine if the all the steering configuration data has been successfully written to the registers in each of the tiles. The firmware may then continue system boot, or another process, if the system boot or process depends on the steering configuration data being written to the tiles.

In some embodiments, the register setup memory may include multicast flags which are used by the multicaster to identify setup registers which have been written to by the firmware but the data thereof has not yet been multicast to the tiles.

In some embodiments, a counter disposed in the register setup memory is used to keep track of pending multicasts, i.e., steering configuration data which has been multicast to the tiles by the multicaster, but pending a confirmation message from the tiles that the data has been received and/or written to the tile registers. The counter is incremented for each transmission of a portion of the steering configuration data to any one of the tiles, and decremented for each confirmation message received from any tile. Therefore, if the counter has a value equal to its initial value, the counter value indicates that all confirmation messages have been received and the data has been received and/or written to the tile registers.

In some embodiments, the firmware writes each portion of the steering configuration data to the its corresponding setup register one at a time and waits to receive an acknowledgement from the multicaster prior to writing another portion of the steering configuration data to its corresponding setup register. In these embodiments, the idle flag register is not needed but may be used in other embodiments.

In some embodiments, the register setup memory includes a setup register and an address register. The firmware writes, as part of the register setup process: a first portion of the steering configuration data to the setup register; and a first address (which is associated with an offset that the first portion should be written to in the steering configuration registers) to the address register. The multicaster multicasts the first portion of the steering configuration data written to the setup register to an offset (given by the first address) in the steering configuration registers of the tiles. Once the multicaster receives the confirmation messages from the tiles that the steering configuration data has been written to the registers, the multicaster sends an acknowledgement to the firmware, which then writes the next portion and its associated offset to the setup register and the address register, respectively, and so on. These embodiments provide a programmable control mechanism with more flexible indirection.

System Description

Figure 1:
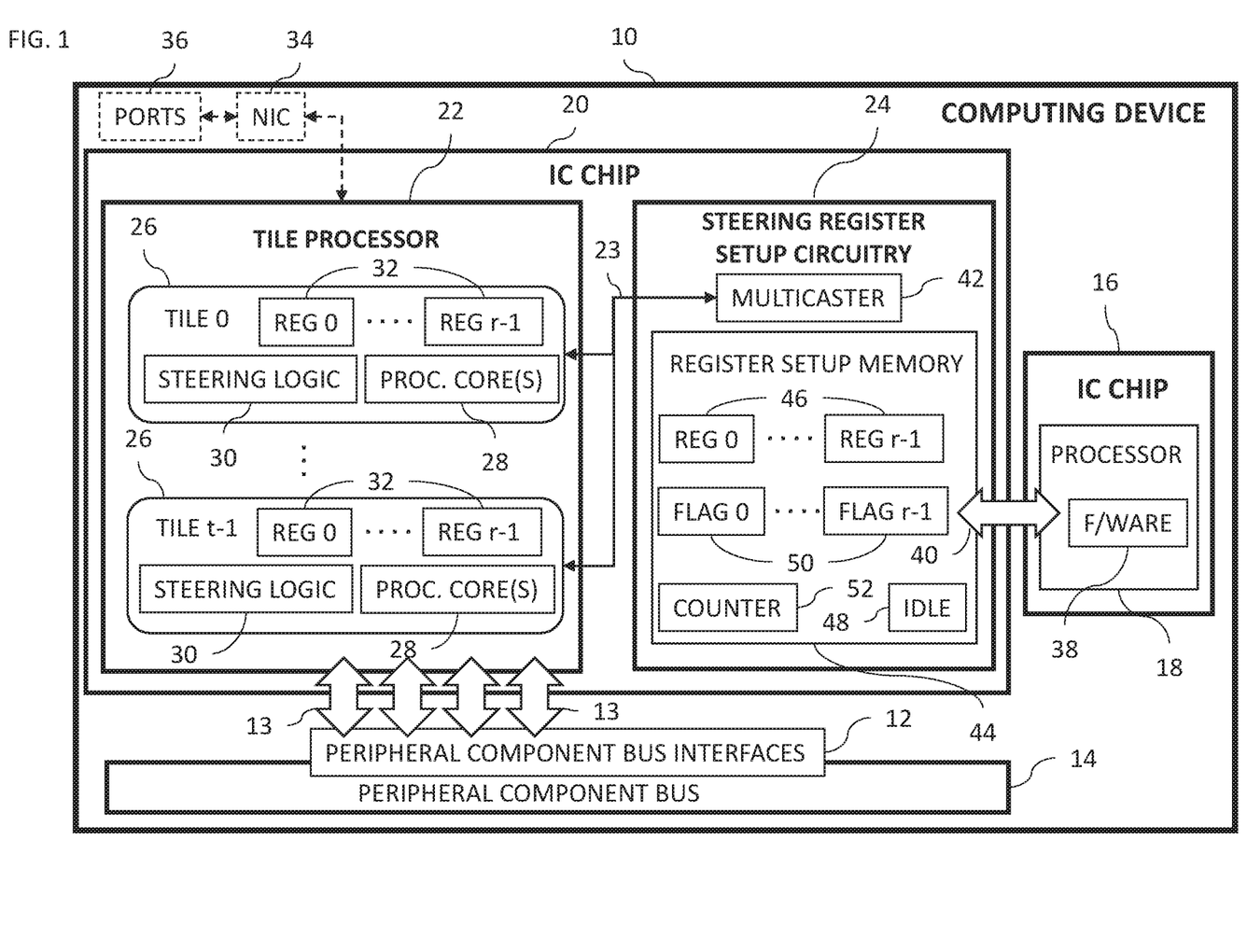
FIG. 1 is a block diagram view of a computing device constructed and operative in accordance with an embodiment of the present invention.

Reference is now made to FIG. 1, which is a block diagram view of a computing device 10 constructed and operative in accordance with an embodiment of the present invention. The computing device 10 includes peripheral component bus interfaces 12 configured for connection to a peripheral component bus 14. The peripheral component bus interfaces 12 may operate in accordance with any suitable protocol, for example, but not limited to, PCIe.

The computing device 10 also includes an integrated circuit (IC) chip 16 comprising a processor 18 configured to initiate a register setup process of the device 10. The computing device 10 also includes an IC chip 20 comprising a tile processor 22 and steering register setup circuitry 24. The tile processor 22 and the steering register setup circuitry 24 may be connected using an interconnect 23, such as a mesh interconnect. The tile processor 22 comprises t tiles 26 (only two shown for the sake of simplicity). Each tile 26 includes one or more processing cores 28, steering logic 30, and r steering configuration registers 32 (only two are shown for the sake of simplicity). The tile processor 22 may include any suitable number of the tiles 26. The processing cores 28 are configured to perform any suitable processing function including generating requests to one or more of the peripheral component bus interfaces 12. The steering configuration registers 32 are configured to store steering configuration data (for example, downstream bridge address ranges of the peripheral component bus interfaces 12). The steering logic 30 is configured to steer the generated requests responsively to the steering configuration data in the steering configuration registers 32. By way of example, REG0 of the steering configuration registers 32 may hold an "address base" value of x2000, and REG1 (not shown) of the steering configuration registers 32 may hold "address limit" values of x8000. After register setup is complete, when a request arrives at one of the tiles 26, the steering logic 30 of that tile 26 steers the request according to the data in the steering configuration registers 32. If the address of the request falls between x2000 and x8000, the request is routed to the associated peripheral component bus interface 12. The tile processor 22 may be implemented using a commercially available tile processor, for example, but not limited to, the TILE-Gx72™ Processor or the TILE-Gx36™ Processor available from Mellanox Technologies of Sunnyvale, Calif., or using a custom-built tile processor.

In some embodiments, each peripheral component bus interface 12 has its own interface 13 (only two labeled for the sake of simplicity) with the tile processor 22. The address ranges in the steering configuration registers 32 are used to select which of the interfaces 13 to route the request to.

The computing device 10 may optionally include a network interface controller 34 and ports 36 for connection to a packet data network (not shown), for example. The tiles 26 may process data flowing between the network interface controller 34 and the peripheral component bus interfaces 12.

The computing device 10 includes a chip interface 40 configured to provide data connection between the IC chip 16 and the IC chip 20. The chip interface 40 may comprise any suitable chip-to-chip link.

The steering register setup circuitry 24 includes a multicaster 42 and a register setup memory 44. The register setup memory 44 may include any suitable volatile memory, such as static random-access memory (RAM) or dynamic RAM.

The processor 18 is configured to write, as part of the register setup process, the steering configuration data to the register setup memory 44 on the IC chip 20 via the chip interface 40. In some embodiments, the steering configuration data includes PCIe bridge values formatted according to the PCIe Type 1 Header format, thereby defining the number of bits per steering configuration register 32. In other embodiments, the steering configuration data may be formatted according to any suitable format.

In some embodiments, the processor 18 is configured to execute software code (e.g., firmware 38 or any other suitable software), which includes instructions, when read by the processor cause the processor 18 to write, as part of the register setup process, the steering configuration data to the register setup memory 44 on the IC chip 20 via the chip interface 40. In general, the processor 18 may be implemented using any suitable processor, for example, but not limited to, a processor running software, such as firmware 38, to perform the functions of the processor 18. In practice, some or all of the functions of the processor 18 may be combined in a single physical component or, alternatively, implemented using multiple physical components. These physical components may comprise hard-wired or programmable devices, or a combination of the two. In some embodiments, at least some of the functions may be carried out by a programmable processor under the control of suitable software. This software may be downloaded to a device in electronic form, over a network, for example. Alternatively, or additionally, the software may be stored in tangible, non-transitory computer-readable storage media, such as optical, magnetic, or electronic memory. The functions performed by the processor 18 are described in more detail below and with reference to the flowchart of FIG. 2.

The multicaster 42 is configured, responsively to the steering configuration data being written to the register setup memory 44, to multicast the steering configuration data written to the register setup memory 44 on the IC chip 20 to the steering configuration registers 32 of the tiles 26 on the IC chip 20.

In some embodiments, the multicaster 42 is implemented as a hardware state machine configured to multicast the steering configuration data written to the register setup memory 44 on the IC chip 20 to the steering configuration registers 32 of the tiles 26 on the IC chip 20.

In practice, some or all of the functions of the multicaster 42 may be combined in a single physical component or, alternatively, implemented using multiple physical components. These physical components may comprise hard-wired or programmable devices, or a combination of the two. In some embodiments, at least some of the functions may be carried out by a programmable processor under the control of suitable software. This software may be downloaded to a device in electronic form, over a network, for example. Alternatively, or additionally, the software may be stored in tangible, non-transitory computer-readable storage media, such as optical, magnetic, or electronic memory.

The functions performed by the multicaster 42 are described in more detail below and with reference to the flowcharts of FIGS. 3A-C, 6 and 9.

In some embodiments, the register setup memory 44 includes respective setup registers 46 (corresponding with the steering configuration registers 32) and associated with respective offsets in the steering configuration registers 32 of the tiles 26. Only two of the r setup registers 46 are shown in FIG. 1 for the sake of simplicity. The processor 18 is configured to write, as part of the register setup process, respective portions of the steering configuration data to the respective setup registers 46 in the register setup memory 44. The portions may be divided according to any suitable division, for example, each portion may include data of a different PCIe address range.

The multicaster 42 monitors the setup registers 46 for data updates written by the processor 18. The multicaster 42 is configured, responsively to the steering configuration data being written to the setup registers 46 of the register setup memory 44, to multicast the respective portions of the steering configuration data written to the respective setup registers 46 to the respective offsets in the steering configuration registers 32 of the tiles 26.

Upon completion of the steering configuration data being written to the steering configuration registers 32, for example, based on confirmation messages received from the tiles 26, the multicaster 42 is configured to provide an acknowledgement that the steering configuration data has been written to the steering configuration registers 32 of the tiles 26.

In some embodiments, the steering register setup circuitry 24 includes an idle flag register 48, which indicates the state of the multicaster 42. For example, if the idle flag register 48 has a value of 1 the multicaster 42 is idle and if the value is 0 the multicaster 42 is non-idle. When the multicaster 42 detects data written to any of the setup registers 46, the idle flag register 48 is set to a non-idle value (e.g., 0). The multicaster 42 is configured to set the idle flag register 48 to an idle value (e.g., to 1) to provide the acknowledgement that the steering configuration data has been written to the steering configuration registers 32 of the tiles 26. The processor 18 is configured to read the idle flag register 48 intermittently to confirm that the steering configuration data has been written to the steering configuration registers 32 of the tiles 26. The setting of the idle flag register 48 is described in more detail with reference to FIGS. 3A and 3B.

In other embodiments, the status of the multicaster 42 may be conveyed by the multicaster 42 to the processor 18 using one or more acknowledgement messages.

In some embodiments, the register setup memory 44 of the steering register setup circuitry 24 may include respective multicast flag registers 50 (only two of the r multicast flags 50 are shown in FIG. 1 for the sake of simplicity) of respective ones of the setup registers 46. The respective multicast flag registers 50 are used by the multicaster 42 to identify respective setup registers 46 which have been written to by the processor 18 but the data thereof has not yet been multicast to the tiles 26. For example, one of the multicast flag registers 50 (e.g., FLAG 0) is set to 1 by the multicaster 42 when data is written to the corresponding setup register 46 (e.g., REG 0) by the processor 18. That multicast flag register 50 (e.g., FLAG 0) is then reset to 0 by the multicaster 42 when the data in the corresponding setup register 46 (e.g., REG 0) is multicast by the multicaster 42 to the corresponding steering configuration register 32 of the tiles 26. Therefore, multicaster 42 is configured to set respective ones of the multicast flag registers 50 responsively to the processor 38 writing respective ones of the portions to the respective setup registers 46. The multicaster 42 is configured to reset respective ones of the multicast flag registers 50 responsively to multicasting respective ones of the portions to the respective offsets in the steering configuration registers the tiles 26.

In some embodiments, a counter 52 disposed in the register setup memory 44 of the steering register setup circuitry 24 is used to keep track of pending multicasts, i.e., steering configuration data which has been multicast to the tiles 26 by the multicaster 42, but pending receipt of a confirmation message from the tiles 26 that the data has been received and/or written to the tile registers 32. The multicaster 42 sets the counter 52 to an initial value, e.g., zero. The counter 52 may, be used for tracking pending multicasts for all the setup registers 46. In some embodiments, a separate counter may be used for each setup register 46.

The multicaster 42 is configured to advance (e.g., increment) the counter in one direction (e.g., in a positive direction) responsively to the multicaster 42 transmitting any one portion of the steering configuration data to a corresponding one of the steering configuration registers 32 of one of the tiles 26. For example, the counter 52 may be incremented by 1 when the multicaster 42 transmits the contents of REG 0 in the register setup memory 44 to REG 0 in TILE 0. The multicaster 42 is configured to receive a message from one of the tiles 26 confirming that one of the portions of the steering configuration data (e.g., the contents of REG r-1 in the register setup memory 44) has been written to one of the steering configuration registers (e.g., REG r-1 in TILE t-1). Each tile 26 includes a receiver element (not shown), which receives requests via the interconnect 23, performs reads from, and writes to, the steering configuration registers 32, and prepares and sends the confirmation messages to the multicaster 42. The multicaster 42 is configured, responsively to receiving the message, to advance (e.g., decrement) the counter 52 in an opposite direction (e.g., in a negative direction).

Other suitable methods may be used to keep track of pending multicasts. For example, the register setup memory 44 may include a set of t (corresponding to the number of tiles) "waiting-for-response" bits per setup register 46. When data of one of the setup registers 46 is transmitted to one of the tiles 26, the respective "waiting-for-response" bit is set. When the response from that tile 26 for that setup register 46 is received, the bit is cleared.

In some embodiments, the multicaster 42 is configured to provide the acknowledgement (e.g., by setting the idle flag register 48 to 1) that the steering configuration data has been written to the steering configuration registers 32 of the tiles 26 responsively to the counter 52 having a value equal to the initial value (e.g., zero) and each of the multicast flag registers 50 being in a reset state (e.g., having a value of zero).

Figure 2:
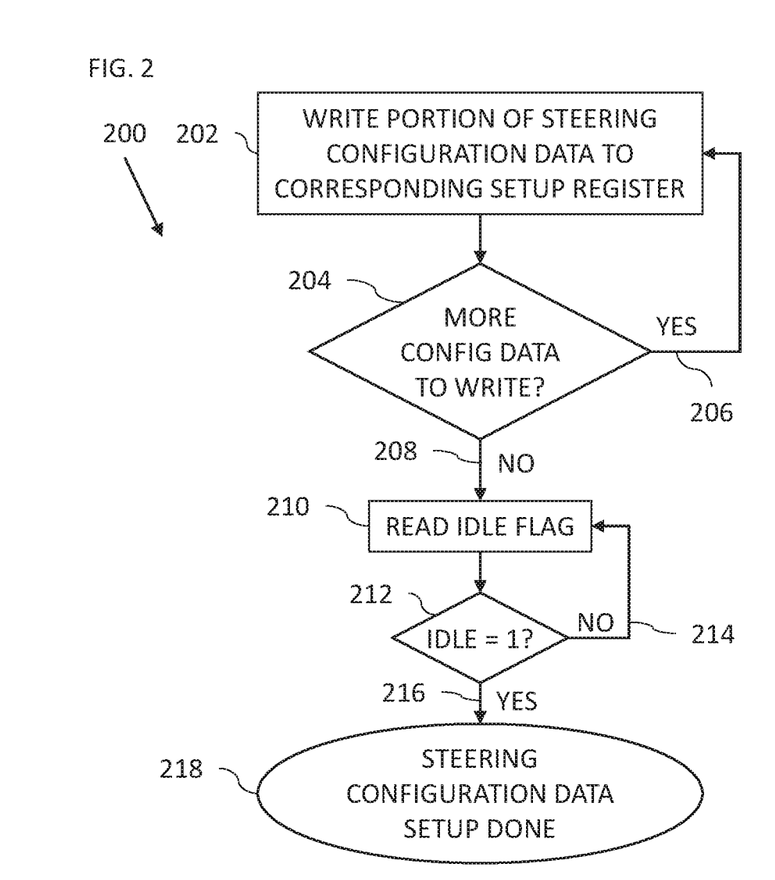
FIG. 2 is a flowchart including steps in a method of operation of a processor of the computing device of FIG. 1.

Reference is now made to FIG. 2, which is a flowchart 200 including steps in a method of operation of the processor 18 of the computing device 10 of FIG. 1. Reference is also made to FIG. 1. The processor 18 is configured to write (block 202) a portion of the steering configuration data to the corresponding setup register 46 in the register setup memory 44 of the steering register setup circuitry 24. For example, the processor 18 writes a first portion of the steering configuration data to REG O in the register setup memory 44. At a decision block 204, the processor 18 checks if there is more configuration data to write to the setup registers 46. If there is more data to write (branch 206), the step of block 202 is repeated. If there is no more data to write (branch 208), the processor 18 is configured to read (block 210) the idle flag register 48. The processor 18 is configured to check (block 212) if the data in the idle flag register 48 corresponds with an idle value (e.g., 1). If the data in the idle flag register 48 does not correspond with an idle value (branch 214), the step of block 210 is repeated, optionally after a delay. If the data in the idle flag register 48 does correspond with an idle value (branch 216), the steering configuration data setup process is deemed completed (block 218).

A method of operation of the multicaster 42 is now described with reference to flowcharts of FIG. 3A-C. The sub-methods of FIGS. 3A-C are typically performed by the multicaster 42 independently of each other.

Figure 3A:
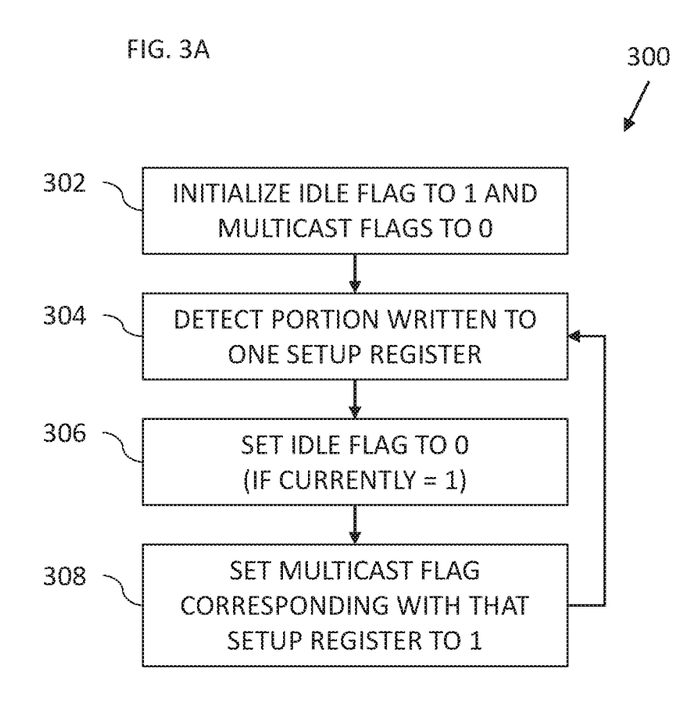

Reference is now made to FIG. 3A, which is a flowchart 300 including steps in a method of operation of the multicaster 42 of the computing device 10 of FIG. 1. Reference is also made to FIG. 1. The multicaster 42 is configured to initialize (block 302) the idle flag register 48 (e.g., to 1) and the multicast flag registers 50 to zero. The multicaster 42 is configured to monitor the setup registers 46 and detect (block 304) when a portion of the steering configuration data is written to one of the setup registers 46. Upon detecting that a portion of the steering configuration data has been written to one of the setup registers 46 (e.g., REG 0), the multicaster 42 is configured to set (block 306) the idle flag register 48 to a non-idle value (e.g., zero) if the idle flag register 48 is currently set to an idle value (e.g., 1), and to set (block 308) the multicast flag register 50 (e.g., FLAG 0) corresponding with that setup register 46 (e.g., REG 0) to a value (e.g., 1) indicating that the data in that setup register 46 is pending multicast. The steps of blocks 304-308 are repeated for other portions of the steering configuration data and other corresponding setup registers 46.

Figure 3B:
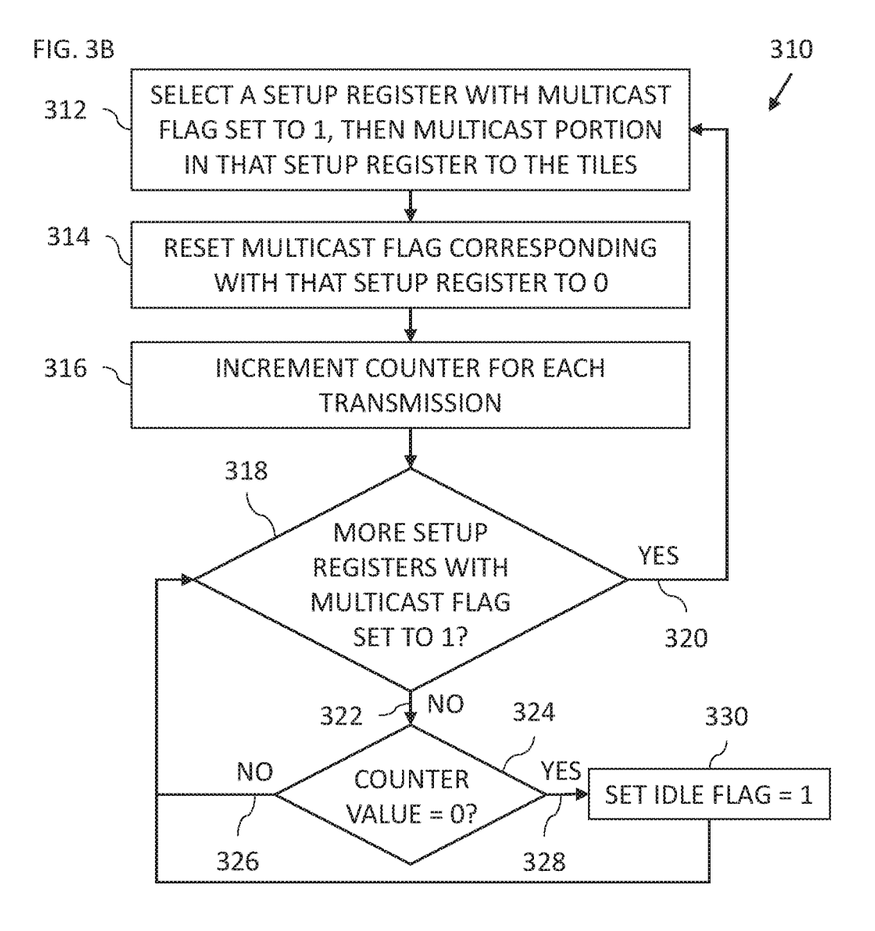

Reference is now made to FIG. 3B, which is a flowchart 310 including steps in a method of operation of the multicaster 42 of the computing device 10 of FIG. 1, Reference is also made to FIG. 1. The multicaster 42 is configured to select (block 312) one of the setup registers 46 with its corresponding multicast flag register 50 set (e.g., to 1) indicating that the data in that setup register 46 is pending multicast. Responsively, the multicaster 42 is then configured to multicast the portion of the steering configuration data in that setup register 46 to the corresponding steering configuration register 32 in the tiles 26 in accordance with the offset in the steering configuration registers 32 associated with that setup register 46. The multicaster 42 is configured to reset (block 314) that multicast flag register 50 corresponding with that setup register 46 (e.g., to zero). The multicaster 42 is also configured to increment (block 316) the counter 52 (e.g., by 1) for each transmission of the portion of the steering configuration data) to the tiles 26, The multicaster 42 is configured to check (decision block 318) if there are more setup registers 46 with a corresponding one of the multicast flag registers 50 set (e.g., to 1). If there are more setup registers 46 with a corresponding one of the multicast flag registers 50 set (e.g., to 1) (branch 320), the steps of blocks 312-318 are repeated. If there are no more setup registers 46 with a corresponding one of the multicast flag registers 50 set (e.g., to 1) (branch 322), the multicaster 42 is configured to check (decision block 324) if the counter 52 has a value equal to its initial value (e.g., zero). If the value is not equal to the initial value (branch 326), the step of decision block 318 is repeated. If the value is equal to the initial value (branch 328), the multicaster 42 is configured to set (block 330) the idle flag register 48 to an idle value (e.g., 1) and processing continues with the step of block 318.

Figure 3C:
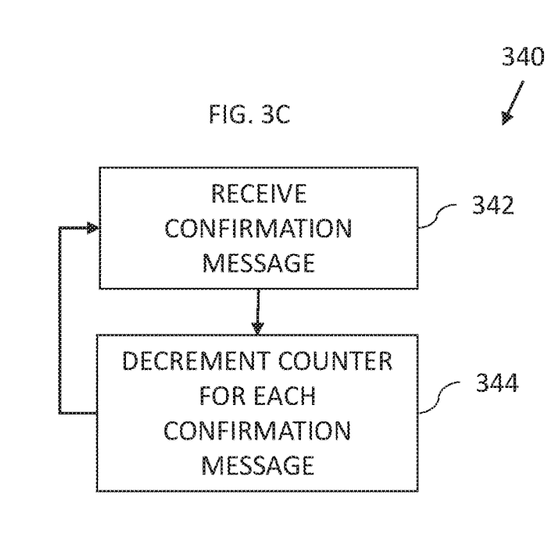

Reference is now made to FIG. 3C, which is a flowchart 340 including steps in a method of operation of the multicaster 42 of the computing device 10 of FIG. 1. Reference is also made to FIG. 1, The multicaster 42 is configured to receive (block 342) a confirmation message from one of the tiles 26 that one of the portions of the steering configuration data has been written to one of the steering configuration registers 32 in that tile 26. In response to receive the message; the multicaster 42 is configured to decrement (block 344) the counter 52 for each confirmation message received.

Figure 4:
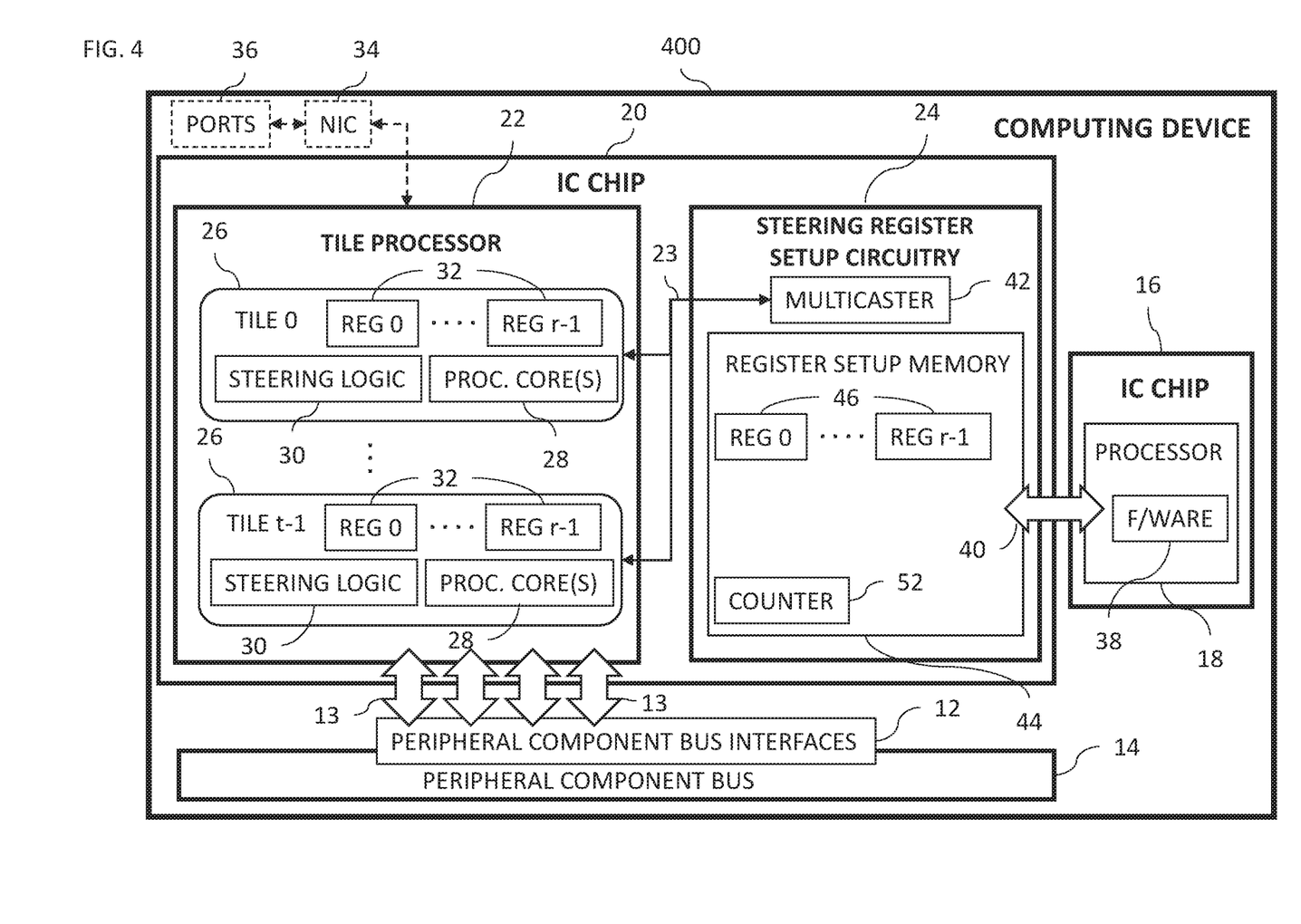
FIG. 4 is a block diagram view of a computing device constructed and operative in accordance with a first alternative embodiment of the present invention.

Reference is now made to FIG. 4, which is a block diagram view of a computing device 400 constructed and operative in accordance with a first alternative embodiment of the present invention. The computing device 400 is substantially the same as the computing device 10 of FIG. 1 apart from the differences described below. The reference numerals used with respect to elements of the computing device 10 are also used with respect to the same elements in the computing device 400 for the sake of clarity. The computing device 400 shown in FIG. 4 does not include the multicast flag registers 50 and the idle flag register 48.

In some embodiments, the processor 18 is configured to write each portion of the steering configuration data to its corresponding setup register 46 one at a time and wait to receive an acknowledgement from the multicaster 42 prior to writing another portion of the steering configuration data to its corresponding setup register 46. In these embodiments, the idle flag register is not needed but may be used in other embodiments.

The computing device 400 is now described in more detail.

The processor 18 is configured to write a first respective portion of the steering configuration data to a first respective one of the setup registers 46 (e.g., REG 0) in the register setup memory 44. The multicaster 42 is configured, responsively to the first respective portion being written to the register setup memory 44, to multicast the first respective portion 46 to a respective one of the offsets in the steering configuration registers 32 (e.g., to REG 0) of the tiles 26. The multicaster 42 is configured to provide an acknowledgement that the first respective portion has been written to the respective offset in the steering configuration registers 32 of the tiles 26. Providing the acknowledgement is generally conditioned on the multicaster 42 receiving confirmation messages from the tiles 26 using the tracking mechanism of the counter 52 described below in more detail with reference to FIG. 6 or any other suitable tracking mechanism. The processor 18 is configured, responsively to receiving the acknowledgement, to write a second respective portion of the steering configuration data to a second respective one of the setup registers 46 in the register setup memory 44. The multicaster 42 then multicasts the second portion, provides an acknowledgement to the processor 18, and so on with other portions of the steering configuration data.

Figure 5:
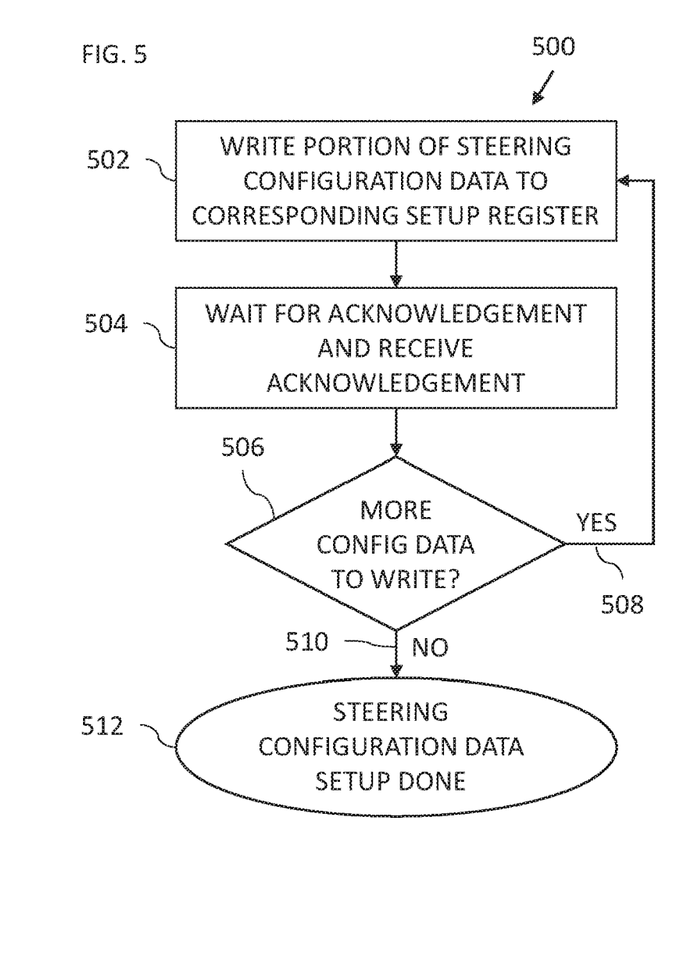
FIG. 5 is a flowchart including steps in a method of operation of a processor of the computing device of FIG. 4.

Reference is now made to FIG. 5, which is a flowchart 500 including steps in a method of operation of the processor 18 of the computing device 400 of FIG. 4. Reference is also made to FIG. 4. The processor 18 is configured to write (block 502) a portion of the steering configuration data to the corresponding setup register 46. For example, the processor 18 writes a first portion of the steering configuration data to REG 0 of the setup registers 46. The processor 18 is configured to wait for and receive (block 504) the acknowledgement from the multicaster 42 that that portion has been written to the steering configuration registers 32 in the tiles 26. The processor 18 is configured to check (decision block 506) if there are more portions of the steering configuration data to write to the setup registers 46. If there are additional portion(s) to write (branch 508), the steps of blocks 502-504 are repeated for the additional portion(s). If there are no more portion(s) to write (branch 510), the steering configuration data setup process is deemed to be completed (block 512).

Figure 6:
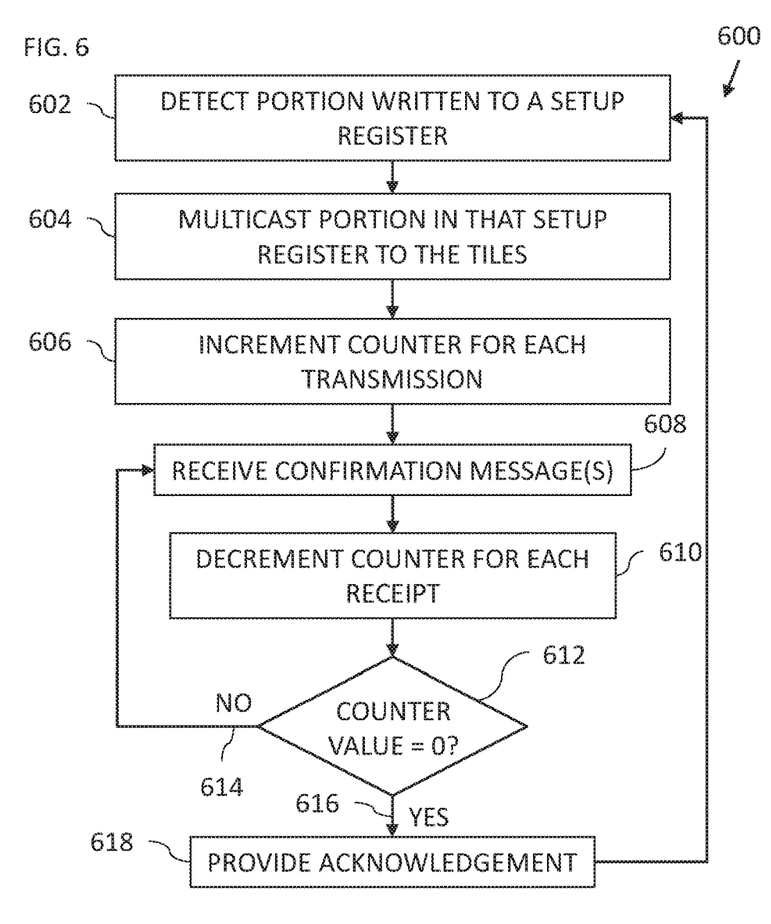
FIG. 6 is a flowchart including steps in a method of operation of a multicaster of the computing device of FIG. 4.

Reference is now made to FIG. 6, which is a flowchart 600 including steps in a method of operation of the multicaster 42 of the computing device 400 of FIG. 4. Reference is also made to FIG. 4. The multicaster 42 is configured to monitor the setup registers 46 and detect (block 602) when a portion of the steering configuration data is written to one of the setup registers 46. In response to detecting that the portion has been written to one of the setup registers 46, the multicaster 42 is configured to multicast (block 604) that portion of the steering configuration data in that setup register 46 to the corresponding steering configuration register 32 in the tiles 26 in accordance with the offset in the steering configuration registers 32 associated with that setup register 46. The multicaster 42 is also configured to increment (block 606) the counter 52 (e.g., by 1) for each transmission of that portion of the steering configuration data to the tiles 26. The multicaster 42 is configured to receive (block 608) confirmation message(s) from one or more of the tiles 26 that that portion of the steering configuration data has been written to one of the steering configuration registers 32 in the tile(s) 26. In response to receiving the message, the multicaster 42 is configured to decrement (block 610) the counter 52 for each confirmation message received. The multicaster 42 is configured to check (decision block 612) if the counter 52 has a value equal to its initial value (e.g., zero). If the value is not equal to the initial value (branch 614), the steps of blocks 608-610 are repeated. If the value is equal to the initial value (branch 616), the multicaster 42 is configured to provide (block 618) an acknowledgement that the portion has been written to the steering configuration registers 32 of the tiles 26. The steps of blocks 602-612 are repeated for subsequent portions of the steering configuration data.

Figure 7:
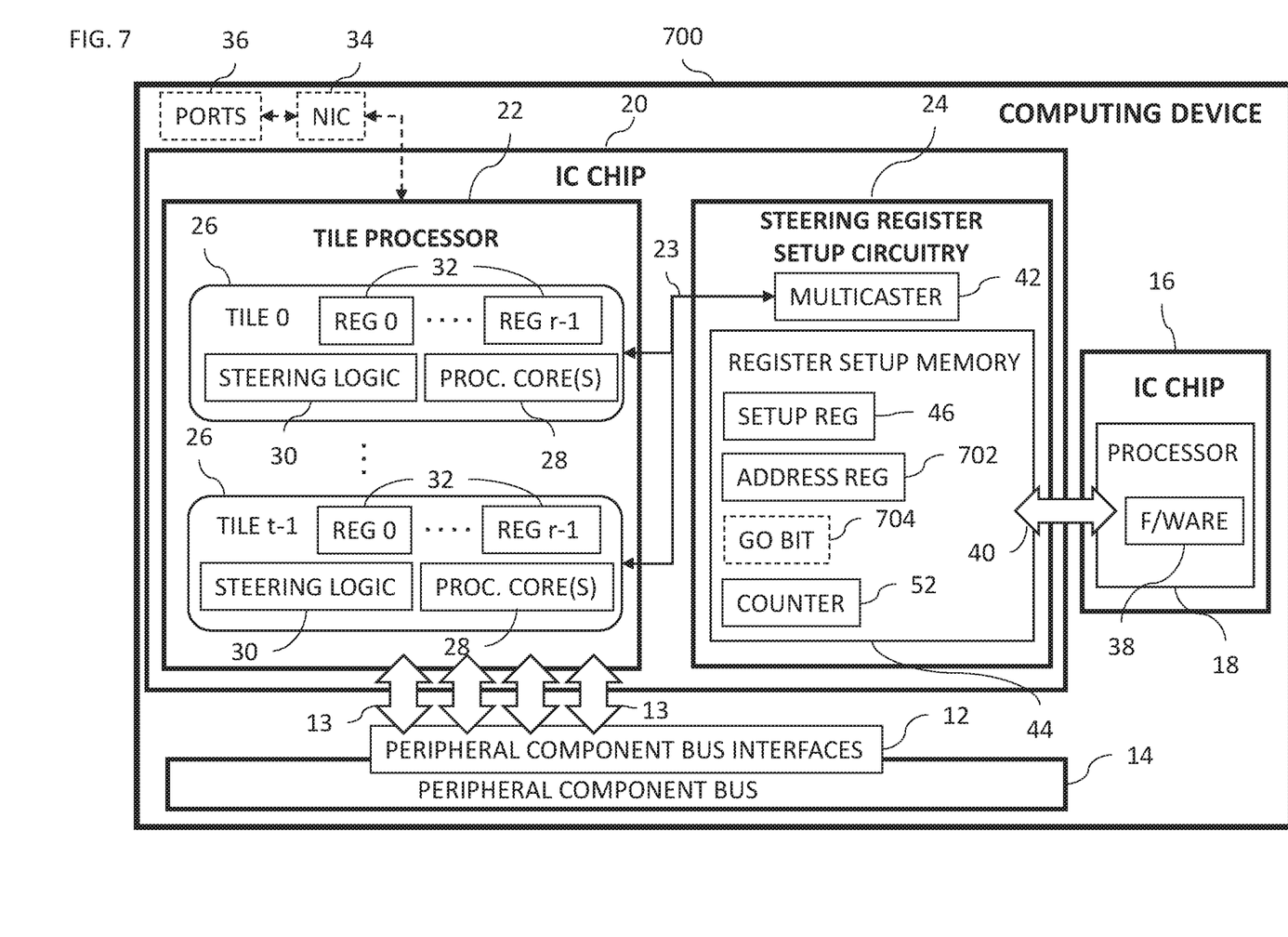
FIG. 7 is a block diagram view of a computing device constructed and operative in accordance with a second alternative embodiment of the present invention.

Reference is now made to FIG. 7, which is a block diagram view of a computing device 700 constructed and operative in accordance with a second alternative embodiment of the present invention.

The computing device 700 is substantially the same as the computing device 10 of FIG. 1 apart from the differences described below. The reference numerals used with respect to elements of the computing device 10 are also used with respect to the same elements in the computing device 700 for the sake of clarity. The computing device 700 shown in FIG. 7 does not include the multicast flag registers 50 and the idle flag register 48. Additionally, the register setup memory 44 of the computing device 700 includes a single setup register 46 and an address register 702.

The computing device 700 is now described in more detail.

The processor 18 is configured to write, as part of the register setup process: a first portion of the steering configuration data to the setup register 46; and a first address, which is associated with the first portion, to the address register 702.

The multicaster 42 multicasts the first portion of the steering configuration data written to the setup register 46 to an offset (given by the first address) in the steering configuration registers 32 of the tiles 26. Once the multicaster 42 receives the confirmation messages from the tiles 26 (which may be tracked using the counter 52 or any other suitable tracking mechanism), the multicaster 42 sends an acknowledgement to the processor 18, which then writes the next portion and it associated offset to the setup register 46 and the address register 702, respectively. The above process is repeated for subsequent portions of the steering configuration data.

The register setup memory 44 optionally includes a go bit 704 or other signaling bit or bits which may be written by the processor 18 to inform the multicaster 42 that data has been written to the setup register 46 and the address register 702. Go bits may also be used with the computing device 10 of FIG. 1 and/or the computing device 400 of FIG. 4 to indicate that data has been written to the setup registers 46. The go bit(s) may form part (e.g., least or most significant bit(s)) of the setup register(s) 46.

Figure 8:
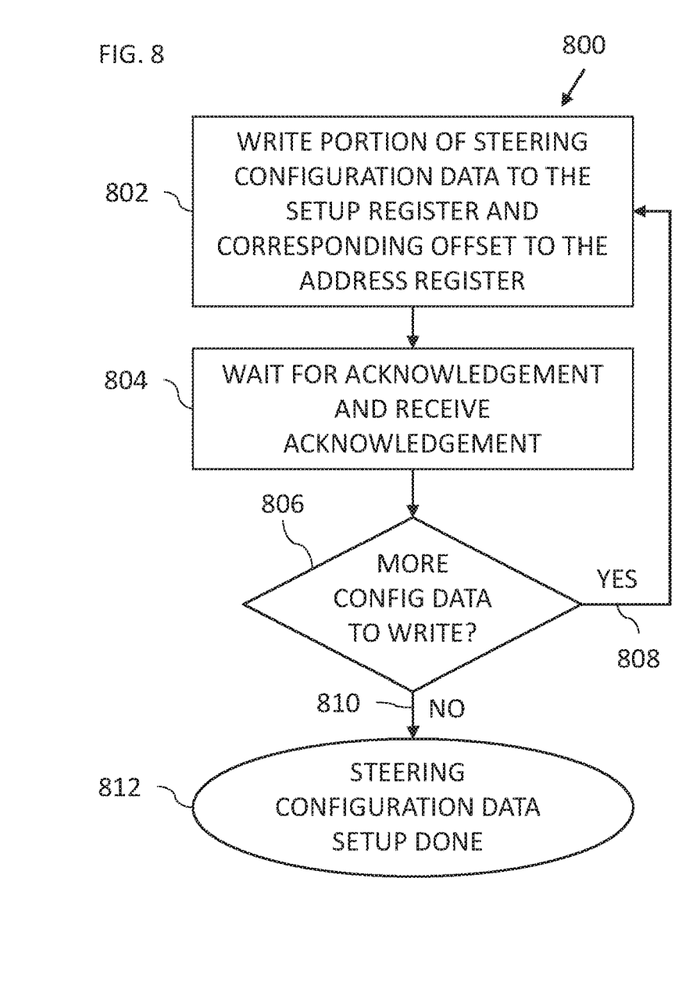
FIG. 8 is a flowchart including steps in a method of operation of a processor of the computing device of FIG. 7.

Reference is now made to FIG. 8, which is a flowchart 800 including steps in a method of operation of the processor 18 of the computing device 700 of FIG. 7. Reference is also made to FIG. 7. The processor 18 is configured to write (block 802) a portion of the steering configuration data to the setup register 46 and the corresponding offset in the steering configuration registers 32 to the address register 702. The processor 18 is configured to wait for and receive (block 804) the acknowledgement from the multicaster 42 that that portion has been written to the steering configuration registers 32 in the tiles 26. The processor 18 is configured to check (decision block 806) if there is an additional portion or portions of the steering configuration data to write to the setup register 46. If there are additional portion(s) to write (branch 808), the steps of blocks 802-804 are repeated for the additional portion(s). If there are no more portion(s) to write (branch 810), the steering configuration data setup process is deemed to be completed (block 812).

Figure 9:
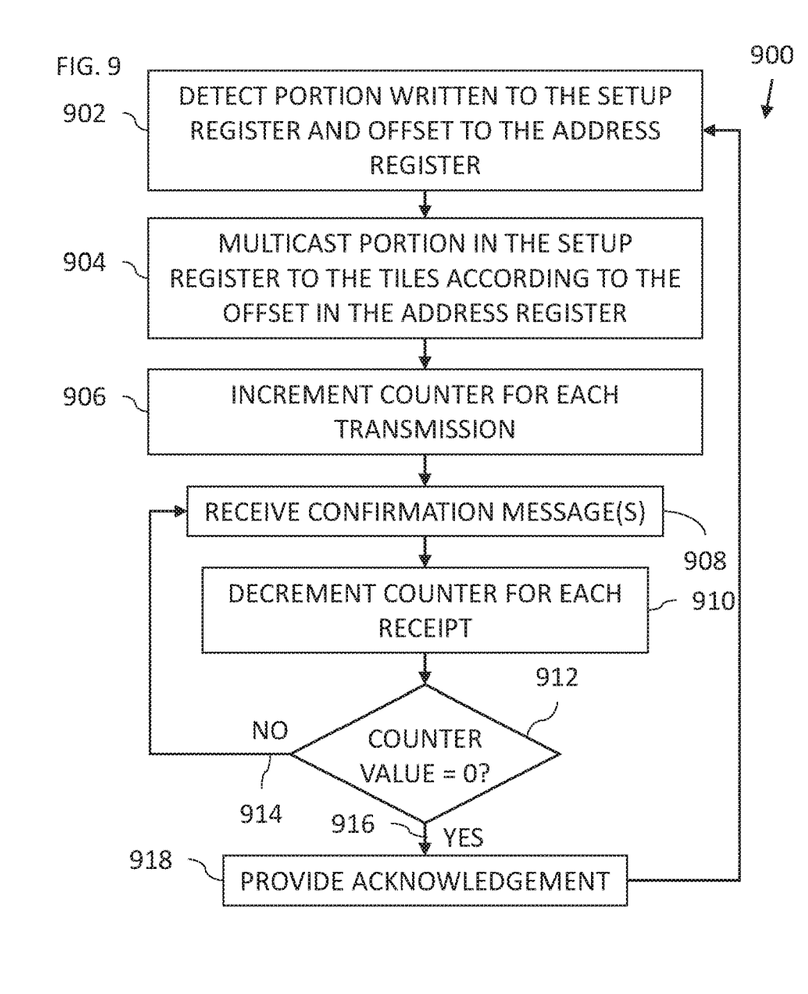
FIG. 9 is a flowchart including steps in a method of operation of a multicaster of the computing device of FIG. 7.

Reference is now made to FIG. 9, which is a flowchart 900 including steps in a method of operation of the multicaster 42 of the computing device 700 of FIG. 7. Reference is also made to FIG. 7. The multicaster 42 is configured to monitor the setup register 46 and/or the address register 702, or the go bit 704, and detect (block 902) when a portion of the steering configuration data is written to the setup register 46. In response to detecting that the portion has been written to the setup register 46, the multicaster 42 is configured to multicast (block 904) that portion of the steering configuration data in the setup register 46 to the corresponding steering configuration register 32 in the tiles 26 in accordance with the offset in the address register 702. The multicaster 42 is also configured to increment (block 906)

the counter 52 (e.g., by 1) for each transmission of that portion of the steering configuration data to the tiles 26. The multicaster 42 is configured to receive (block 908) confirmation message(s) from one or more of the tiles 26 that that portion of the steering configuration data has been written to the corresponding steering configuration register 32 in the tile(s) 26. In response to receiving the message, the multicaster 42 is configured to decrement (block 910) the counter 52 for each confirmation message received. The multicaster 42 is configured to check (decision block 912) if the counter 52 has a value equal to its initial value (e.g., zero). If the value is not equal to the initial value (branch 914), the steps of blocks 908-910 are repeated. If the value is equal to the initial value (branch 916), the multicaster 42 is configured to provide (block 918) an acknowledgement that the portion has been written to the steering configuration registers 32 of the tiles 26. The steps of blocks 902-912 are repeated for subsequent portions of the steering configuration data.

Various features of the invention which are, for clarity, described in the contexts of separate embodiments may also be provided in combination in a single embodiment. Conversely, various features of the invention which are, for brevity, described in the context of a single embodiment may also be provided separately or in any suitable sub-combination.

The embodiments described above are cited by way of example, and the present invention is not limited by what has been particularly shown and described hereinabove. Rather the scope of the invention includes both combinations and subcombinations of the various features described hereinabove, as well as variations and modifications thereof which would occur to persons skilled in the art upon reading the foregoing description and which are not disclosed in the prior art.

What is claimed is:

1. A computing device, comprising:
peripheral component bus interfaces configured for connection to a peripheral component bus;
a first integrated circuit (IC) chip comprising a processor configured to initiate a register setup process of the device;
a second IC chip comprising:
a tile processor comprising multiple tiles, each tile including: at least a processing core configured to generate requests to at least one of the peripheral component bus interfaces; steering configuration registers, which are configured to store steering configuration data; and steering logic configured to steer the generated requests responsively to the steering configuration data in the steering configuration registers; and
steering register setup circuitry comprising a multicaster and a register setup memory; and
a chip interface configured to provide data connection between the first IC chip and the second IC chip, wherein:
the processor is configured to write, as part of the register setup process, the steering configuration data to the register setup memory on the second IC chip via the chip interface;
the multicaster is configured, responsively to the steering configuration data being written to the register setup memory, to multicast the steering configuration data written to the register setup memory on the second IC chip to the steering configuration registers of the tiles on the second IC chip;
the register setup memory includes respective setup registers associated with respective offsets in the steering configuration registers of the tiles;
the steering configuration data includes respective portions;
the processor is configured to write, as part of the register setup process, the respective portions of the steering configuration data to the respective setup registers in the register setup memory;
the multicaster is configured, responsively to the steering configuration data being written to the register setup memory, to multicast the respective portions of the steering configuration data written to the respective setup registers to the respective offsets in the steering configuration registers of the tiles;
the multicaster is configured to provide an acknowledgement that the steering configuration data has been written to the steering configuration registers of the tiles;
the steering register setup circuitry includes respective multicast flag registers for the respective setup registers;
the multicaster is configured to set respective ones of the multicast flag registers responsively to the processor writing respective ones of the portions to the respective setup registers;
the multicaster is configured to reset respective ones of the multicast flag registers responsively to multicasting respective ones of the portions to the respective offsets in the steering configuration registers of the tiles;
the steering register setup circuitry includes a counter set to an initial value;
the multicaster is configured to advance the counter in a first direction responsively to the multicaster transmitting one of the portions of the steering configuration data to one of the steering configuration registers of one of the tiles;
the multicaster is configured to receive a message from one of the tiles confirming that one of the portions of the steering configuration data has been written to one of the steering configuration registers;
the multicaster is configured, responsively to receiving the message, to advance the counter in a second direction, opposite to the first direction; and
the multicaster is configured to provide the acknowledgement that the steering configuration data has been written to the steering configuration registers of the tiles responsively to the counter having a value equal to the initial value and each of the multicast flag registers being in a reset state.

2. The device according to claim 1, wherein: the processor is configured to execute software code, which includes instructions, when read by the processor cause the processor to write, as part of the register setup process, the steering configuration data to the register setup memory on the second chip via the chip interface; and the multicaster includes a hardware state machine configured to multicast the steering configuration data written to the register setup memory on the second chip to the steering configuration registers of the tiles on the second chip.

3. The device according to claim 1, wherein:
the steering register setup circuitry includes an idle flag register;
the multicaster is configured to set the idle flag register to provide the acknowledgement that the steering configuration data has been written to the steering configuration registers of the tiles; and the processor is configured to read the idle flag register to confirm that the steering configuration data has been written to the steering configuration registers of the tiles.

4. The device according to claim 1, wherein:

the processor is configured to write a first respective portion of the steering configuration data to a first respective one of the setup registers in the register setup memory;

the multicaster is configured, responsively to the first respective portion being written to the register setup memory, to multicast the first respective portion to a respective one of the offsets in the steering configuration registers of the tiles;

the multicaster is configured to provide an acknowledgement that the first respective portion has been written to the respective offset in the steering configuration registers of the tiles; and the processor is configured, responsively to the acknowledgement, to write a second respective portion of the steering configuration data to a second respective one of the setup registers in the register setup memory.

5. The device according to claim 1, wherein:

the register setup memory includes a setup register and an address register;

the steering configuration data includes respective portions;

the processor is configured to write, as part of the register setup process: a first portion of the steering configuration data to the setup register; and a first address, which is associated with the first portion, to the address register; and the multicaster is configured to multicast the first portion of the steering configuration data written to the setup register to an offset in the steering configuration registers of the tiles, the offset being given by the first address.

6. A register setup method, comprising:

initiating a register setup process of a device;

writing, as part of the boot process, steering configuration data from a first integrated circuit (IC) chip to a register setup memory on a second IC chip via a chip interface, the writing including writing respective portions of the steering configuration data to the respective setup registers in the register setup memory;

responsively to the steering configuration data being written to the register setup memory, multicasting the steering configuration data written to the register setup memory on the second chip to the steering configuration registers of tiles on the second chip, the multicasting including multicasting the respective portions of the steering configuration data written to the respective setup registers to respective offsets in the steering configuration registers of the tiles;

each of the tiles generating requests to at least one peripheral component bus interface;

steering the generated requests responsively to the steering configuration data in the steering configuration registers;

providing an acknowledgement that the steering configuration data has been written to the steering configuration registers of the tiles;

setting respective multicast flag registers responsively to writing respective ones of the portions to the respective setup registers;

resetting respective ones of the multicast flag registers responsively to multicasting respective ones of the portions to the respective offsets in the steering configuration registers of the tiles;

advancing a counter in a first direction responsively to transmitting one of the portions of the steering configuration data to one of the steering configuration registers of one of the tiles;

receiving a message from one of the tiles confirming that one of the portions of the steering configuration data has been written to one of the steering configuration registers; and responsively to receiving the message, advancing the counter in a second direction, opposite to the first direction, wherein the providing includes providing the acknowledgement that the steering configuration data has been written to the steering configuration registers of the tiles responsively to the counter having a value equal to an initial value of the counter and the multicast flag registers being in a reset state.

7. The method according to claim 6, further comprising:

setting an idle flag register to provide the acknowledgement that the steering configuration data has been written to the steering configuration registers of the tiles; and reading the idle flag register to confirm that the steering configuration data has been written to the steering configuration registers of the tiles.

8. The method according to claim 6, further comprising:

writing a first respective portion of the steering configuration data to a first respective one of the setup registers in the register setup memory;

responsively to the first respective portion being written to the register setup memory, multicasting the first respective portion to a respective one of the offsets in the steering configuration registers of the tiles;

providing an acknowledgement that the first respective portion has been written to the respective offset in the steering configuration registers of the tiles; and responsively to the acknowledgement, writing a second respective portion of the steering configuration data to a second respective one of the setup registers in the register setup memory.

9. The method according to claim 6, wherein:

the writing includes writing: a first portion of the steering configuration data to a setup register in the register setup memory; and a first address, which is associated with the first portion, to an address register in the register setup memory; and multicasting the first portion of the steering configuration data written to the setup register to an offset in the steering configuration registers of the tiles, the offset being given by the first address.

* * * * *